Dec. 31, 1935.   C. STRESINO   2,026,105

METHOD OF MAKING AN INLAID MOLDED ARTICLE

Filed Aug. 3, 1934

INVENTOR.
Carlo Stresino
BY
ATTORNEY.

Patented Dec. 31, 1935

2,026,105

UNITED STATES PATENT OFFICE 2,026,105

METHOD OF MAKING AN INLAID MOLDED ARTICLE

Carlo Stresino, Milwaukee, Wis., assignor to A. O. Smith Corporation, Milwaukee, Wis., a corporation of New York Application August 3, 1934, Serial No. 738,285

5 Claims. (Cl. 41—35)

This invention relates to the art of plastic molding.

An object of the invention is to provide a method for the production of inlaid designs on articles formed by plastic molding.

Other objects of the invention will be apparent from the following detailed description and the accompanying drawing in which.

By making use of plastics compounded from resins and suitable filling material, it is possible to mold articles of many kinds adapted to a wide variety of uses. This invention provides a method for the production of ornamental inlaid designs on such molded articles. While the invention is not limited to the use of any particular kind of plastic material nor to the manufacture of any specific article, it is illustrated in the following description in connection with the production of a design on a table top formed from a synthetic resin such as the phenol-formaldehyde resins or other resin of similar properties associated with suitable filling material.

The table top is composed of suitable backing material surfaced by two or more sheets of fibrous material impregnated with resin. The surface sheets may conveniently consist of resin-impregnated paper or fabric. If the design is to be a metallic inlay on a black background, the sheet which is to form the surface of the table top will be black. This sheet is perforated in accordance with the design which it is desired to produce.

The second sheet of fibrous material will be of the color which it is desired to have inlaid in the perforations in the first sheet. Suitable colors are provided by applying to the second sheet a varnish carrying pigments which produce the desired colors. Metallic powders are suitable pigments for the production of metallic inlays. The varnish is desirably prepared by dissolving a thermo-setting synthetic resin in a solvent. Copper, aluminum, bronze, or other metallic powder can be used in the varnish to produce metallic inlays, depending upon the effect which is desired. Aluminum powder produces an inlay in striking contrast to a black background.

The varnish containing the metal powder is applied to the second sheet which is then dried and preferably heated to partially cure the resin in the varnish. The varnish need not be applied to the entire surface of the second sheet; it is sufficient if the varnish be applied to those portions of the second sheet which are exposed by the perforations in the first sheet. No attempt need be made to confine the varnish exactly to the area exposed by the perforations in the surface sheet. Care should, of course, be taken that the varnish covers all the areas over which the metallic finish is desired, but any excess around the borders of such areas is covered by the surface sheet and does not interfere with the design. Consequently, the application of the varnish to the second sheet does not have to follow closely the outlines of the design which is produced; it is sufficient if the varnish covers the area of the design with sufficient margin to insure against a lack of the metallic finish where it is desired.

Figure 1:
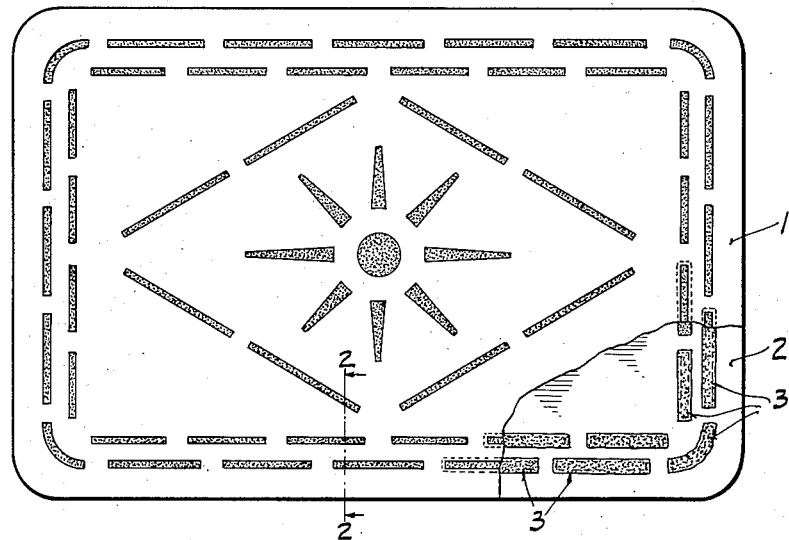
Figure 1 is a plan view of a molded slab provided with an inlaid design in accordance with the method of this invention.

Fig. 1 is a plan view of a molded slab with the perforated surface sheet 1 broken away at the lower right-hand corner to expose the second sheet 2. The varnish will be applied to the second sheet as shown at 3 to cover the areas which are exposed by the perforations in the first sheet and a small margin around these areas.

Figure 2:
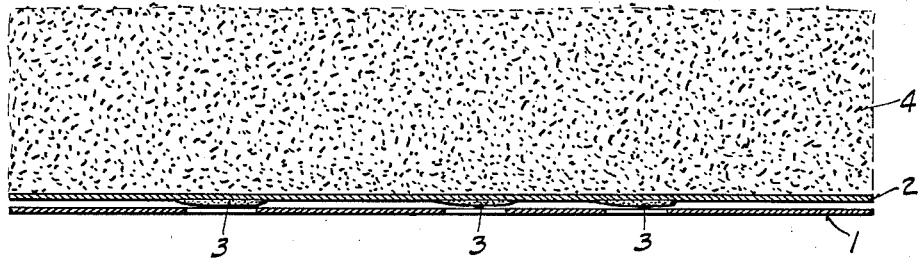
Fig. 2 is a diagrammatic view showing the assembly of the different materials entering into the construction of the slab before they are pressed together.
Figure 3:
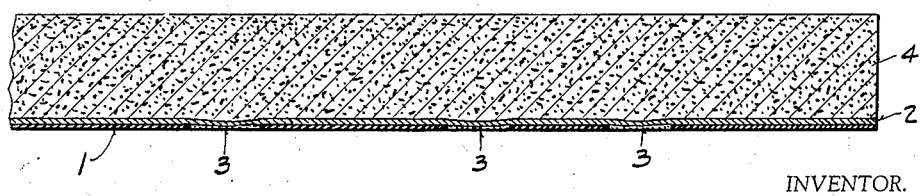
Fig. 3 is a section through the molded slab and the inlaid design.

In making a table top with an inlaid design, the perforated surface sheet is placed in a molding die in contact with the second sheet prepared as described above, and suitable backing material to form the body of the table top. Fig. 3 is an enlarged sectional view showing the disposition of the elements entering into the structure of the table top before they are pressed together, the section being taken on the line 2—2 of Fig. 1. In the embodiment illustrated in Fig. 2, the body of the table top is formed from molding powder 4. In assembling the material for the production of a slab of this kind, the perforated surface sheet 1 is placed on the bottom of the die. Above this there is placed the prepared second sheet 2 with the varnish indicated at 3. Above the second sheet there is placed a sufficient quantity of molding powder 4 to form the body of the table top. Heat and pressure are then applied to the molding die in which these elements have been assembled as shown diagrammatically in the figure, and they are pressed into a table top. In molding the table top, the face on which the design is to be produced should be pressed against a highly polished plate in order that a smooth surface may result, and that the inlay will be flush with the remainder of the surface. As a result of the molding, there is produced a table top with an ornamental design consisting of a metallic inlay on the background provided by the surface sheet. The metal inlay is formed of the metallic particles in the metal powder which are bound together by the resins in the varnish, and is similar in appearance to an inlay consisting of a solid piece of metal.

Fig. 3 is a section through a portion of a table top showing the varnish 3 with the metal powder or other coloring material in the perforations of the surface sheet 1. By proceeding in accordance with the methods of this invention, an inlay is produced which is flush with the surface of the table top and shows no indentation or change of lever, while if the varnish is dispensed with and a perforated sheet of resin-impregnated paper is simply placed upon another sheet of resin-impregnated paper, a design is produced, it is true, but there is a perceptible change of level at the design, and the effect of an inlay is lacking or is deficient.

The degree of heat and pressure required for the production of any molded article will vary with its thickness and the nature of the resins which are employed in its fabrication, and will be suitably chosen in a manner well known to the art.

Various modifications of the invention may be made. It is not essential that the entire design be constituted of one metal. Metal powders of different colors may be used at different portions of the second sheet to produce an inlaid design in which different portions are of contrasting color. In the case of designs which are not readily adapted to production by simple perforation of the surface sheet, the metallic varnish desired may be applied to the second sheet and suitable patterns cut from the surface sheet material fastened thereto by an adhesive which may desirably be a varnish similar in nature to that which is used as a carrier for the metallic powders. Pigments may be substituted for metal powders when it is not required to have a metallic finish.

Also, the backing material need not be formed of molding powder, as illustrated in the described embodiment, but may consist of resin-impregnated sheet material, or other substances capable of giving strength to the article produced. Articles of many different kinds may be ornamented by the method of this invention which is not limited to use in connection with table tops, but may advantageously be employed to decorate molded articles, both large and small.

I claim:

1. The method of producing an inlaid design on a molded article which comprises perforating a surface sheet of resin-impregnated sheet material in accordance with the design which it is desired to produce, applying to a second sheet of resin-impregnated sheet material a varnish carrying pigments suitable for the production of a color which is different from the color of said surface sheet, placing the perforated surface sheet in contact with the varnish-coated face of the second sheet, and uniting said sheets by the application of heat and pressure.

2. The method of producing an inlaid design on a molded article which comprises applying to a sheet of resin-impregnated material a varnish which carries a pigment, placing said varnished sheet in contact with a pattern formed of resin-impregnated sheet material of different color than the varnish to block out all portions of the designs in which the pigment is not to show, and uniting said varnished sheet and pattern of resin-impregnated material by the action of heat and pressure.

3. The method of producing a molded article with a metallic inlay which comprises perforating a surface sheet of resin-impregnated material in accordance with the design which is to be produced, applying to a second sheet of resin-impregnated sheet material a suspension of metallic powder in a varnish formed of resin dissolved in a solvent, drying the varnish, heating to cause a partial curing of the resins contained therein, assembling said varnished sheet with the varnished face in contact with the perforated surface sheet and its opposite face in contact with backing material to form the body of the article, and uniting the backing material, varnished sheet and surface sheet by the application of heat and pressure.

4. The method of producing a molded article with a metal inlay which comprises perforating a surface sheet of resin-impregnated sheet material in accordance with the design which is to be produced, applying to a second sheet of resin-impregnated sheet material a suspension of metallic powder in a varnish formed of resin dissolved in a solvent, drying the varnish, heating to cause a partial curing of the resins contained therein, placing the perforated surface sheet in a molding die, placing thereover the varnished sheet with the varnished face in contact with the perforated surface sheet, placing molding powder above the other surface of the varnished sheet, and uniting the molding powder and sheet material by the action of heat and pressure to form a composite article with a metal inlay on the surface.

5. In the production of a metal inlay on a molded article, the steps which comprise applying to resin-impregnated sheet material a suspension of metallic powder in a varnish, assembling said varnished sheet with the varnished face in contact with a pattern formed from resin-impregnated sheet material which covers only a portion of the surface of said varnished sheet, and uniting said varnished sheet and said pattern by the action of heat and pressure to provide an inlaid surface.

CARLO STRESINO.